United States Patent [19]
Yang

[11] Patent Number: 5,160,838
[45] Date of Patent: Nov. 3, 1992

[54] BINARY DATA PROCESSOR USING DIFFRACTION AND INTERFERENCE OF WAVES

[76] Inventor: Tai-Her Yang, 5-1 Taipin Street, Si-Hu Town, Dzan-Hwa, Taiwan

[21] Appl. No.: 580,637

[22] Filed: Sep. 11, 1990

Related U.S. Application Data

[63] Continuation-in-part of Ser. No. 372,629, Jun. 28, 1989, abandoned, which is a continuation-in-part of Ser. No. 69,153, Jul. 2, 1987, abandoned.

[51] Int. Cl.$^5$ .............................................. H01J 31/50
[52] U.S. Cl. ...................................... 257/113; 250/551
[58] Field of Search ........................... 250/551, 213 A; 377/102; 365/109, 110, 111; 350/162.11, 162.13

[56] References Cited

U.S. PATENT DOCUMENTS 3,358,146 12/1967 Ing et al. ......................... 250/213 A
3,680,080 7/1972 Maure ............................... 250/213 A Primary Examiner—David C. Nelms
Attorney, Agent, or Firm—Leonard Bloom

[57] ABSTRACT

A binary data processor uses a plurality of pairs of light beams for performing "AND", "OR" and "NOT" logic operations. The apparatus includes a plurality of pairs of light beams which singly diffract at apertures and which interface by pairs. Other waves, such as sound waves, may be utilized.

25 Claims, 5 Drawing Sheets

BINARY DATA PROCESSOR USING DIFFRACTION AND INTERFERENCE OF WAVES

CROSS REFERENCE TO RELATED APPLICATION

The present invention constitutes a continuation-in-part of application Ser. No. 372,629 filed on Jun. 2, 1989, abandoned which in turn, is a continuation-in-part of application Ser. No. 069,153 filed on Jul. 2, 1987, abandoned the disclosures of which are incorporated herein by their entireties, respectively.

FIELD OF THE INVENTION

The present invention relates to optical processing of binary data, and more particularly, to performing a plurality of logic operations by a plurality of pairs of light beams which singly diffract at apertures and which interface by pairs, such that the resulting pattern of illumination contains the output information of the optical processor.

BACKGROUND OF THE INVENTION

The use of electromagnetic and sound waves to communicate information is well known in the prior art. The apparatus and method may involve amplitude modulation, frequency modulation, polarization modification or wave train interruption for a single wave train.

For a slit or aperture not too much larger than the wavelength of the wave train, diffraction will occur as the wave passes through the slit. The wave spreads laterally outside the geometric collimation limits. The intensity of the wave passes through maxima and nulls as the angle from beam axis direction increases, the magnitude of the maxima rapidly decreasing as the angle increases.

While diffraction is always present in the propagation of a single wave train, it is not involved in the basic communication mechanism of amplitude modulation, frequency modulation, polarization modification or wave train interruption. Radiation of one frequency is used for amplitude modulation, polarization modification and wave train interruption while a bandwidth of frequencies is associated with frequency modulation.

Coherence within one beam of light is utilized in U.S. Pat. No. 3,776,616, issued to N. Douklias on Dec. 4, 1973, wherein a multichannel correlator illuminates an object for the purpose of producing a hologram.

The prior art discloses devices in which a single wave train may be refracted or diffracted with respect to itself. However, the need remains for a binary logic apparatus and method for two coherent input beams to perform logic operations "AND", "OR" or "NOT". These binary logic operations of "AND", "OR", and "NOT" are the logic blocks used to construct the most sophisticated and complex digital circuits.

SUMMARY OF THE INVENTION

It is an object of the present invention to provide a binary data processor which utilizes a pair of light beams (or other waves, such as sound waves) which diffract at apertures, singly, and which interfere in pairs.

More particularly, the present invention is an apparatus and method for performing "AND", "OR", and "NOT" operations on a pair of coherent input light signals which diffract and interfere to produce the logic outputs.

The preferred apparatus comprises a sealed chamber having a pair of side portions including a first side portion and a second side portion. A pair of slits is disposed in the first side portion and the slits are sufficiently close to one another that coherent light falling on the slits from a source outside the chamber will produce two beams of light which interfere inside the sealed chamber. A mechanical or electro-optical shutter is provided at each slit so as to turn the light ON and OFF from the respective slit. A source of coherent light is provided externally of the sealed chamber; this light illuminates the slits by traveling along a path in a medium which may be air, vacuum or a bundle of fiber optic tubes. The intensity of illumination on the second side portion of the sealed chamber depends on an angle $\theta$, which is the angle of derivation from the direction of propagation. The intensity varies rapidly as the angle $\theta$ is increased from 0°. At angles $\theta_1$, the angles of destructive interference, the intensity is zero. Intensity maxima occur at angles $\theta_2$ which fall between the minima at angles $\theta_1$. The intensity maxima is largest for $\theta_2 = 0°$, and successive maxima fall off in intensity.

For a double slit system, the intensity at angle $\theta$ is given by—

$$I = I_m(\cos\beta)^2 \left(\frac{\sin\alpha}{\alpha}\right)^2$$

in which—

$$\beta = \left(\frac{\pi D}{\lambda}\right)\sin\theta \text{ and } \alpha = \left(\frac{\pi W}{\lambda}\right)\sin\theta$$

where—
$I_m$ = maximum intensity of central bright line,
$\lambda$ = wavelength,
D = separation between slits, and
W = width of each slit.

The controlled interference between pairs of light beams provides for the basic logic operations AND, OR and NOT. The logic AND operation yields a binary "1" for the simultaneous illumination at a constructive interference angle $\theta_2$ and a null at cancellation angle $\theta_1$ and binary "0" for all other combinations. The OR operation yields a binary "1" for illumination at a constructive interference angle $\theta_2$ and binary "0" for no illumination at $\theta_2$. The NOT operation is provided by interference with a reference beam and observation at a cancellation angle at which there is a cancellation or "0" for signal beam ON or "1" and illumination or "1" for signal beam OFF or "0".

Combinations of AND, OR and NOT comprise the most sophisticated circuits. Because registration of the logic operation may be at large distance in the present invention, processing initiated at one location may be completed at a remote receiver which communicates with the sender location via waves which travel at the speed of light.

These and other objects of the present invention will become apparent from a reading of the following specification, taken in conjunction with the enclosed drawings.

DESCRIPTION OF THE PREFERRED EMBODIMENTS

Figure 1:
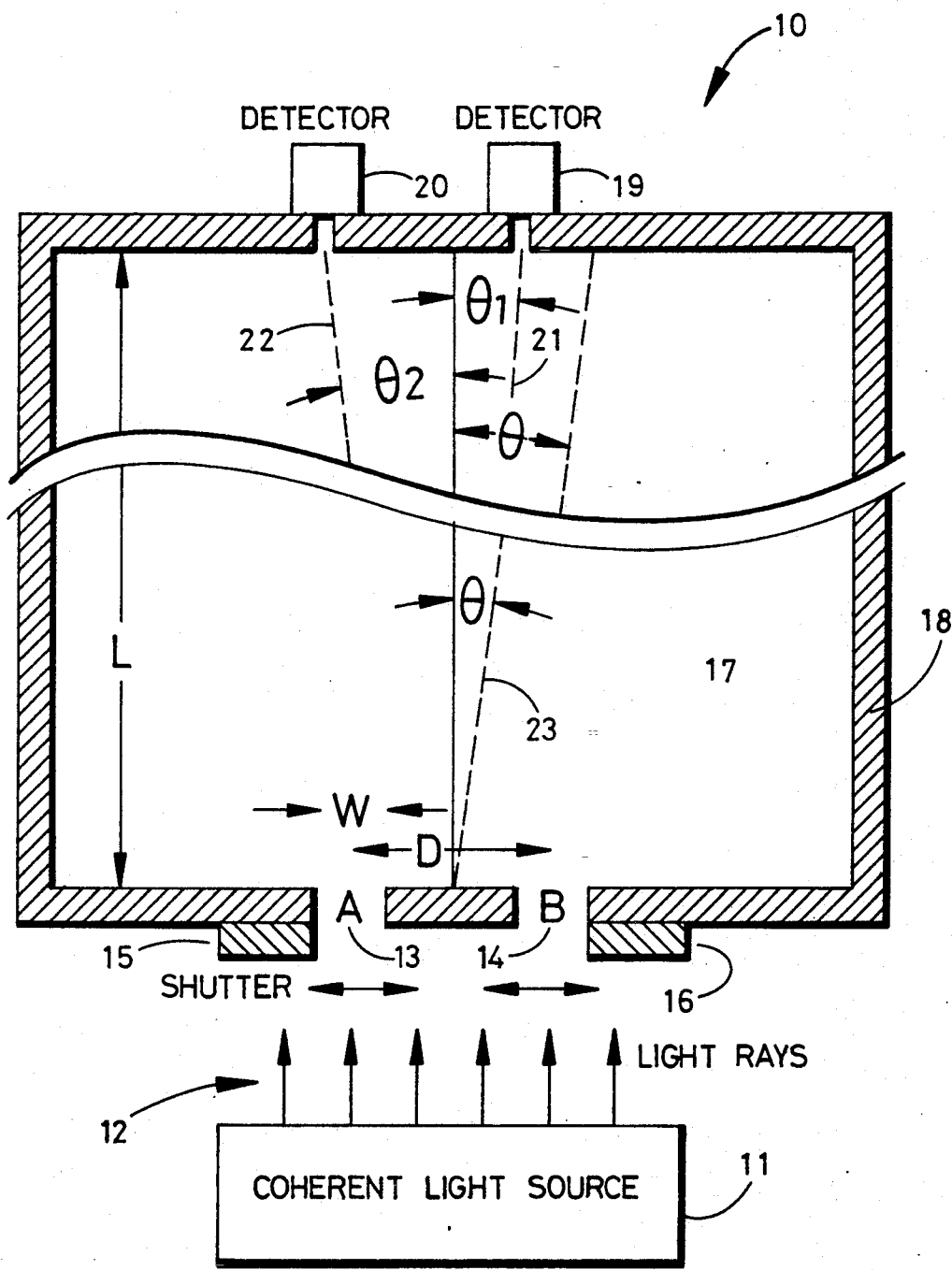
FIG. 1 is a schematic drawing of a two-slit apparatus for binary processing by diffraction and interference.

Referring to FIG. 1, there is illustrated (schematically) an optical processor 10, wherein a coherent light source 11 projects a beam of light which illuminates a pair of slits 13 and 14 in the wall 18 of a sealed chamber 17. When shutters 13 and 14 are open, two beams of light are admitted into the chamber, propagate the length L, and illuminate the wall opposite to the slits. Detectors 19 and 20 are positioned at angles 21 ($\theta_1$) and 22 ($\theta_2$), respectively, where the angle 23 ($\theta$) is measured relative to axis midway between and parallel to the beams from slits 13 and 14, respectively.

Figure 2:
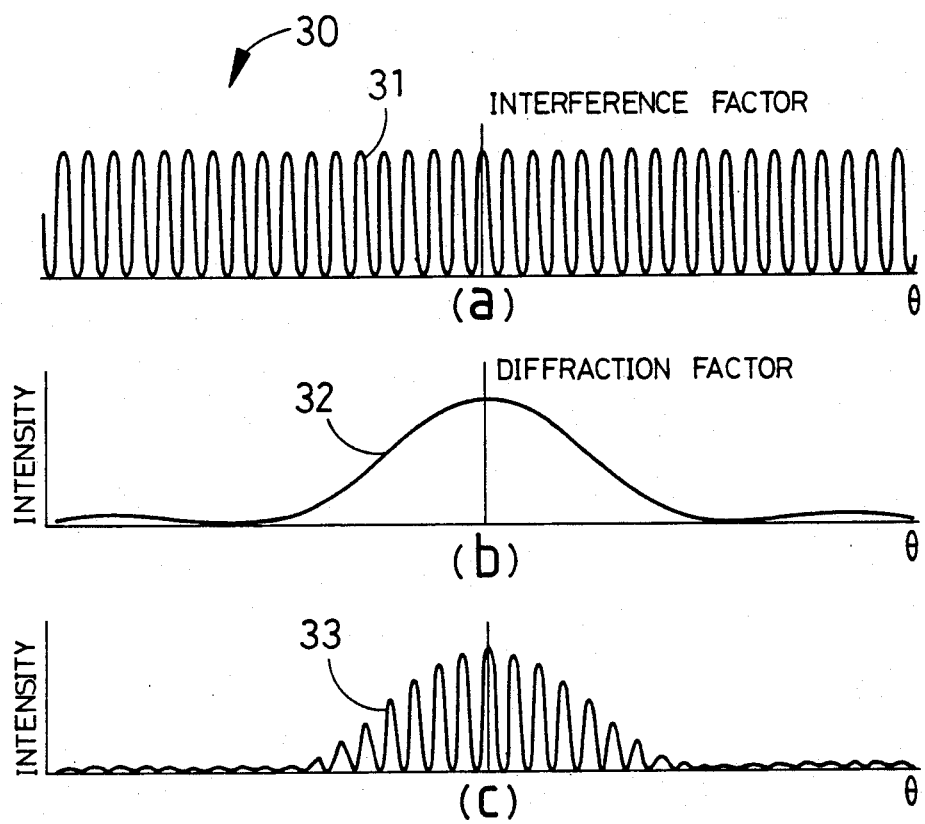
FIG. 2 illustrates the multiplication of the diffraction pattern by the interference factor to form the intensity pattern for a two-slit system.

When only one slit (13 or 14) is open, the intensity pattern as a function of angle 23 ($\theta$) is curve 32 in FIG. 2. When both slits are open, light waves from the two slits interfere. The resultant intensity pattern 33 is the product of the diffraction intensity curve 32 and the interference factor 31.

Figure 3:
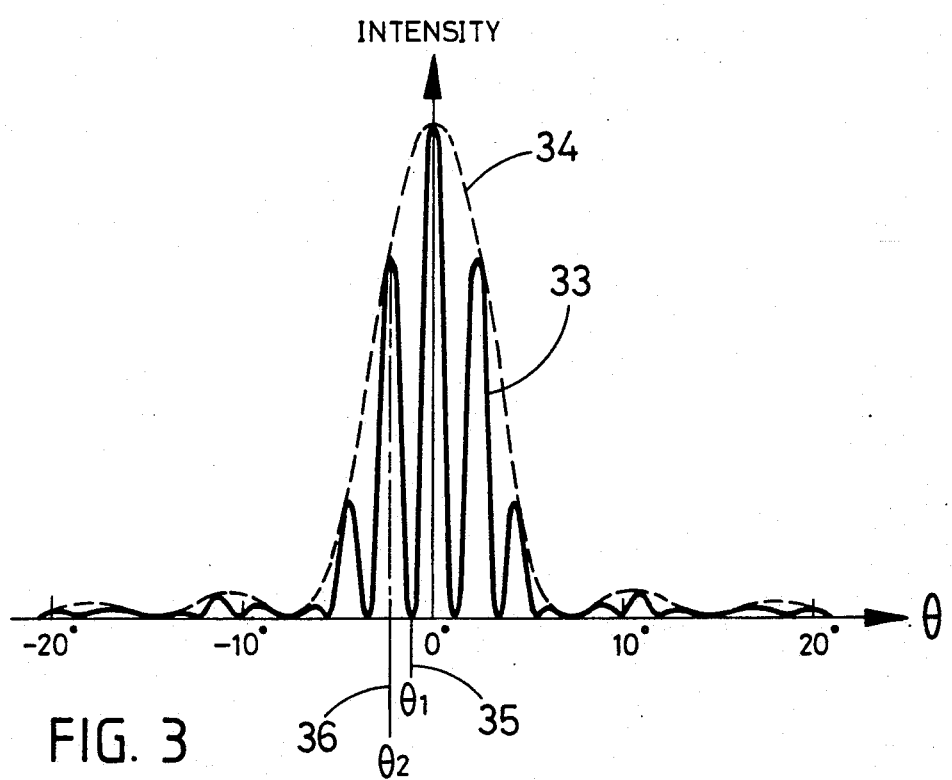
FIG. 3 shows the cancellation angle $\theta_1$, and the constructive interference angle $\theta_2$ for a two-slit system.

Referring to FIG. 3 and to FIG. 1, the logic operations AND, OR and NOT are simply implemented. The AND operation yields a binary "1" at a constructive interference angle $\theta_2$ simultaneously with a null at a cancellation angle $\theta_1$. Two detectors working cooperatively are required for the AND operation. The OR operation yields a binary "1" for illumination at a constructive interference angle $\theta_2$ and binary "0" for no illumination. The NOT operation requires a reference beam disposed to interfere with the signal beam. This can be implemented in FIG. 1 by regarding the beam through open slit 14 as the reference beam. A detector at $\theta_1$ will have an inverted or "NOT" output with respect a signal beam through slit 13. When slit 13 is "ON" or "1", the yield at $\theta_1$ is null corresponding to logic "0".

Figure 4:
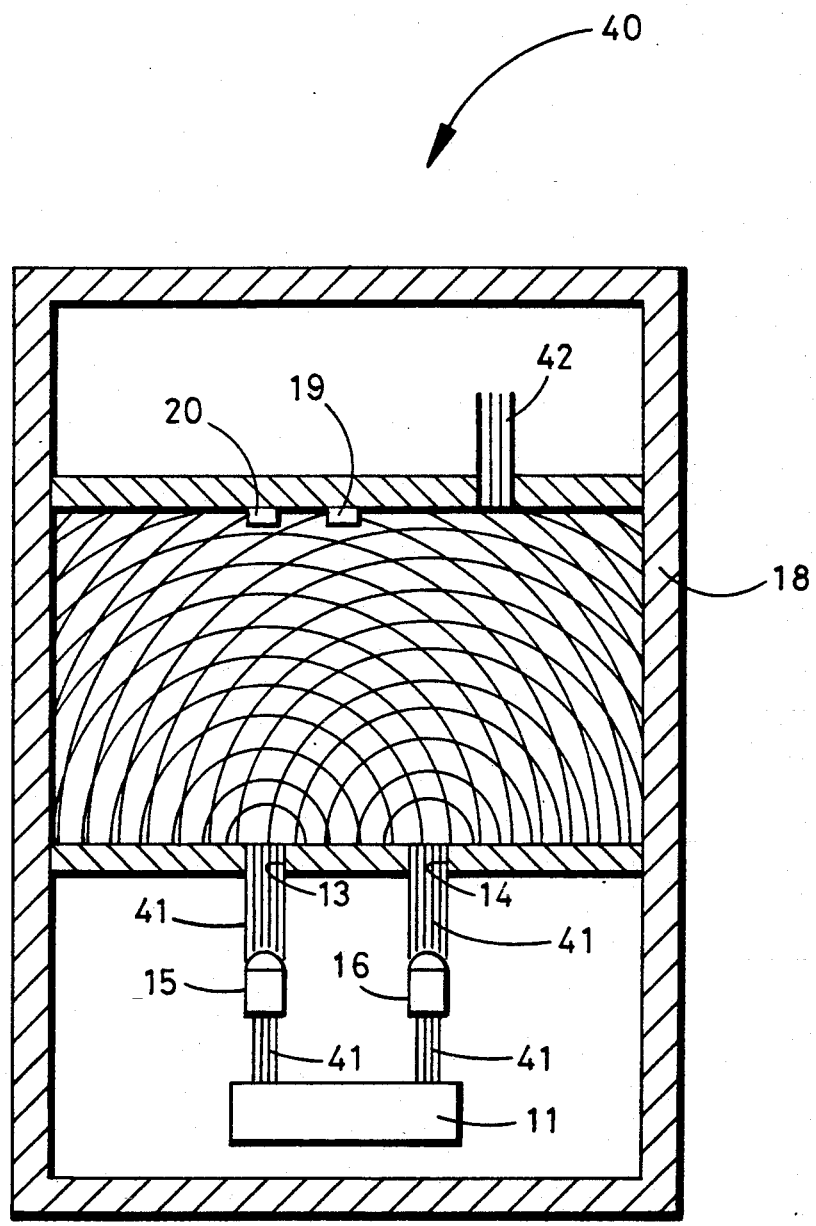
FIG. 4 is a schematic diagram of a two-slit optical processor with light pipes connecting the slits to the coherent light source.

In a second embodiment shown in FIG. 4, light from the coherent light source is transmitted through solid light pipes 41 to the electro-optical shutters 15 and 16, respectively. In addition to the detectors 19 and 20, there is an output light pipe 42 mounted on the wall opposite the slits.

Figure 5:
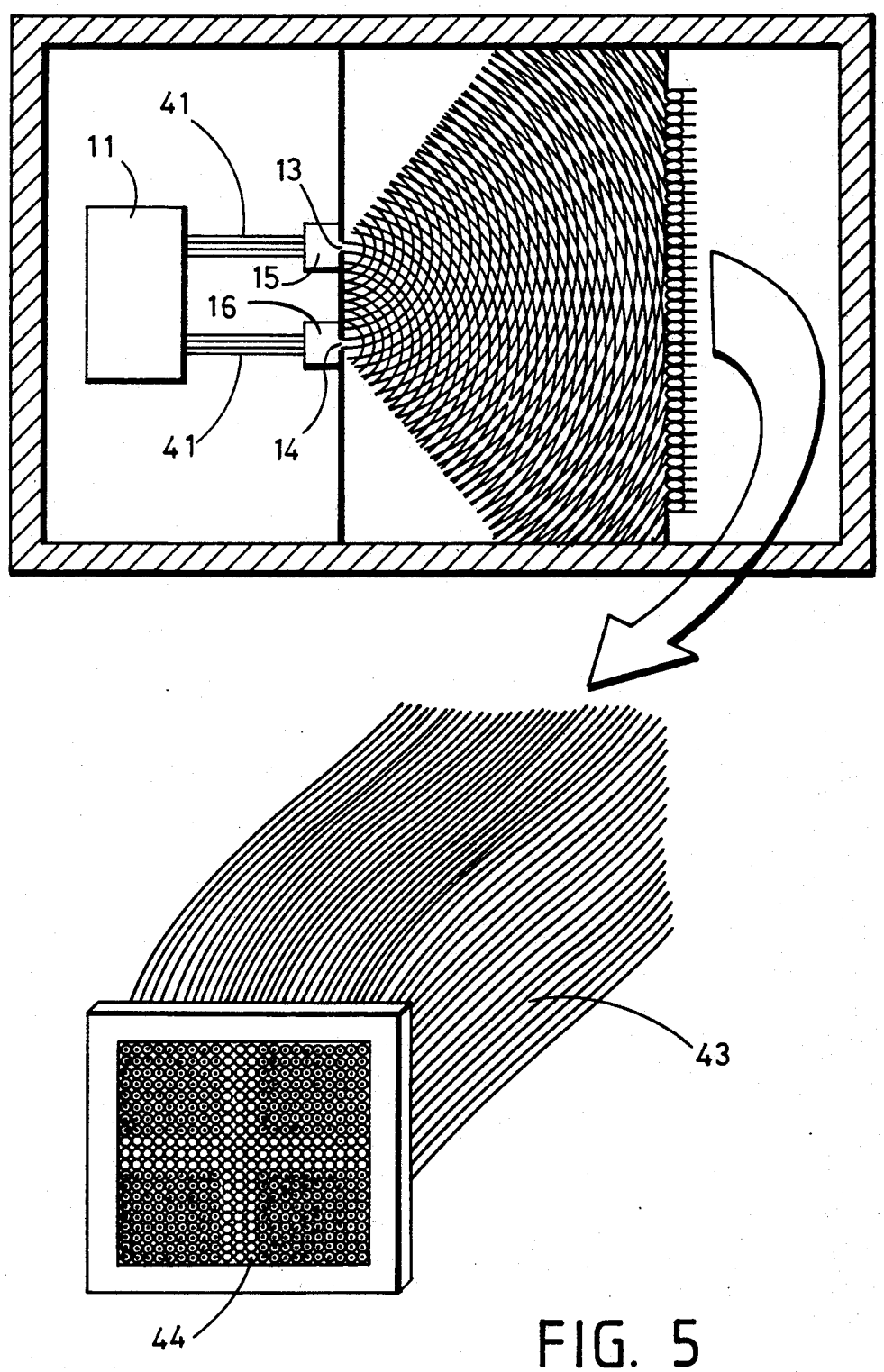
FIG. 5 is a schematic diagram of an optical processor with a fiber optic pattern display.

FIGS. 2 and 3 teach the extension of the interference pattern 33 over angle $\theta$. FIG. 5 shows another embodiment in which detectors 19 and 20 are replaced by an optic fiber bundle, the end faces of which form the entire wall opposite the slits. The light pattern incident on the wall is conducted through the bundle of optic fibers and is transmitted to the other end of the bundle. There it can be digitally encoded or visually observed.

Figure 6:
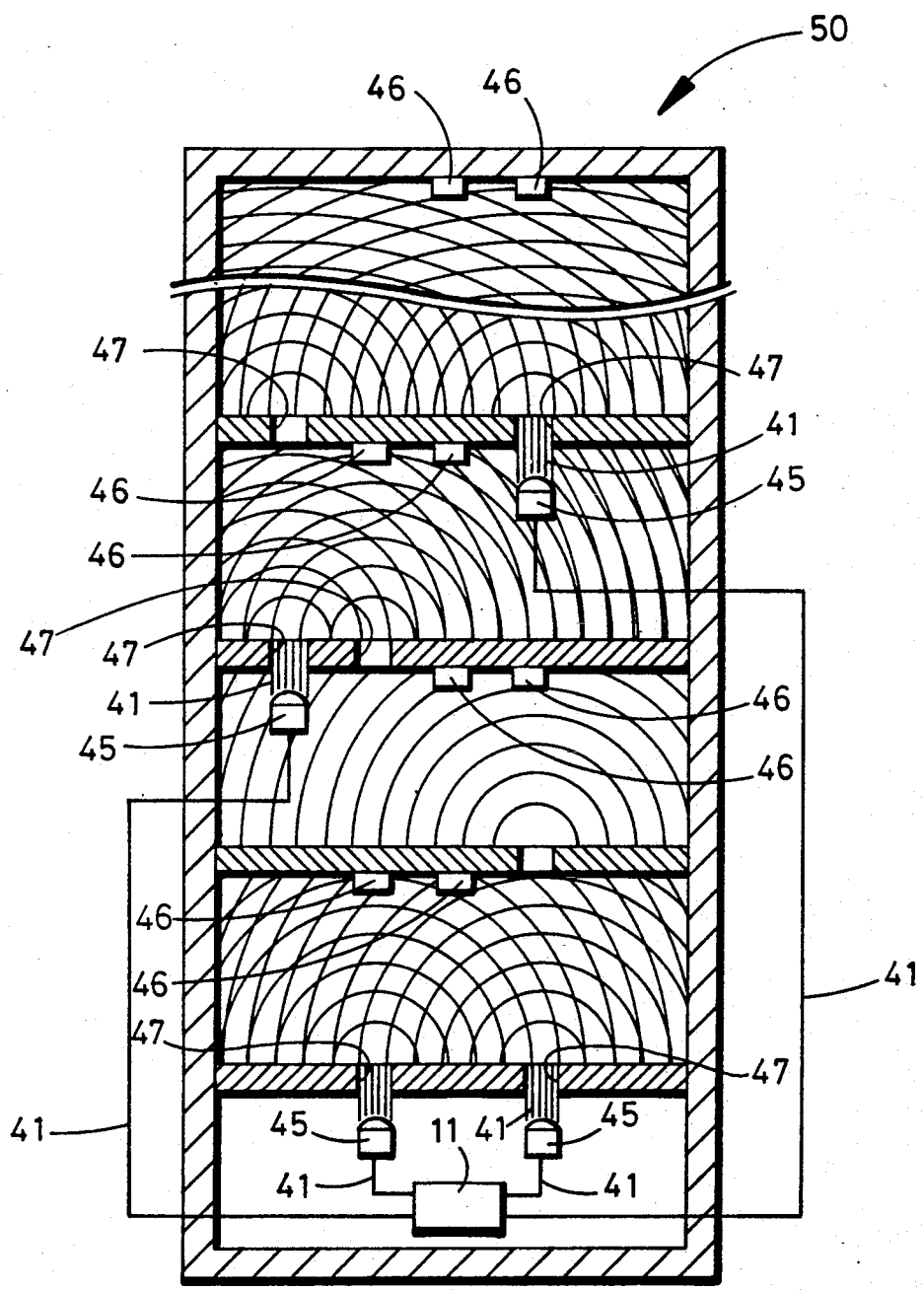
FIG. 6 is a schematic diagram of a multi-step optical processor.

Useful digital systems involve many logic steps. FIG. 6 shows a series of optical processing steps in which coherent light from source 11 is conducted through light pipes 41 to the respective shutters, each of which operates independently. Exaggerated displacements and source separations are shown for clarity and simplicity of explanation.

Obviously, many modifications may be made without departing from the basic spirit of the present invention. Accordingly, it will be appreciated by those skilled in the art, that within the scope of the appended claims, the invention may be practiced other than has been specifically described herein.

What is claimed is:

1. An optical logic gate, comprising:
   a housing having a front surface and opposing back surface;
   a source of coherent light externally of the housing for illuminating said front surface;
   a pair of parallel diffraction slits formed in the front surface of said housing, said pair of diffraction slits including a first slit and a second slit parallely spaced to admit two interfering beams light from said light source into said housing;
   a pair of optical shutters corresponding to said pair of diffraction slits, said optical shutters each being selectively operable in one of a logic "0" and a logic "1" state to respectively obstruct/admit one of said beams of light from/into said housing;
   whereby when both of said optical shutters are operated in a logic "1" state said two beams of light both enter said housing and form an interference pattern comprising a series of alternating intensity maxima and minima incident along said back surface of said housing, and when both of said optical shutters are operated in a logic "0" state no light enters said housing, and when one of said optical shutters is operated in a logic "1" state while another of said optical shutters is operated in a logic "0" state one of said beams of light enters said housing and falls incident without interference on said back surface of said housing; and
   a pair of optical sensors mounted on the back surface of said housing and exposed to said pair of diffraction slits, each of said optical sensors detecting light propagating from said diffraction slits and outputting one of a logic "0" and a logic "1" in accordance with a threshold intensity of light, said pair of sensors further including a first sensor positioned at an intensity minima and a second sensor positioned at an intensity maxima of said interference pattern formed when both of said optical shutters are operated in a logic "1" state.

2. The optical logic gate according to claim 1, wherein a logical OR of the logic states of said pair of optical shutters is indicated by said second sensor.

3. The optical logic gate according to claim 2, wherein a logic "1" state at one of said optical shutters is indicated by a logic "1" output from said second sensor.

4. The optical logic gate according to claim 1, wherein a logical AND of the logic states of said pair of optical shutters is indicated by pair of optical sensors.

5. The optical logic gate according to claim 4, wherein a logic "1" state at both of said optical shutters is indicated by a logic "1" output from said second sensor and a logic "0" output from said first sensor.

6. The optical logic gate according to claim 1, wherein a logical NOT is performed on the logic state of one of said optical shutters by selecting a logic "1" state at the other of said optical shutters.

7. The optical logic gate according to claim 6, wherein a logical NOT is performed on the logic state of one of said optical shutters by selecting a reference logic "1" state at the other of said optical shutters.

8. The optical logic gate according to claim 7, wherein a logic "1" state at said one optical shutter is indicated by a logic "0" output from an optical sensor, and a logic "0" state at said one optical shutter is indicated by a logic "1" output from said optical sensor.

9. The optical logic gate of claim 1, wherein said optical sensors further comprise solid state photoelectric devices.

10. The optical logic gate of claim 1, wherein said optical sensors each comprise a phototube with a photocathode and amplifying dynodes.

11. The optical logic gate of claim 1, further comprising a bundle of fiber optic tubes connecting said coherent light source with one of said optical shutters.

12. The optical logic gate of claim 1, wherein said optical shutters each further comprise a mechanical shutter including a door, the door having a first closed position corresponding to a logic "0" state in which said light beam is obstructed from entering said housing, and the door having a second open position corresponding to a logic "1" state in which said light beam is admitted into said housing; and
a means for disposing the door at one position or the other.

13. The optical logic gate of claim 1, wherein each one of said optical shutters further comprises an electrooptic medium covering a respective one of said shutters, said electrooptic medium having a first opaque state corresponding to a logic "0" state in which said light beam is obstructed from entering said housing, and a second transparent state corresponding to a logic "1" state in which said light beam is admitted into said housing, and
electrical control means for electrically switching between said first state and said second state of said electrooptic medium.

14. The optical logic gate of claim 1, wherein each one of said optical shutters further comprises an magnetooptic medium covering a respective one of said shutters, said magnetooptic medium having a first opaque state corresponding to a logic "0" state in which said light beam is obstructed from entering said housing, and a second transparent state corresponding to a logic "1" state in which said light beam is admitted into said housing, and
magnetic control means for magnetically switching between said first state and said second state of said electrooptic medium.

15. The optical logic gate of claim 1, wherein the enclosure contains an optical medium other than vacuum or atmospheric air, said media being a gas other than air, a liquid or a solid.

16. The optical logic gate of claim 1, wherein the light source is a laser.

17. An optical logic gate, comprising:
a bundle of optical fibers each having a first end and a second end, the collective first ends of said optical fibers being aligned to form a first surface;
a chamber bounded by said first surface and an opposing second surface;
a source of coherent light externally of the chamber for illuminating said second surface;
a pair of parallel diffraction slits formed in the second surface of said housing, said pair of diffraction slits including a first slit and a second slit parallely spaced to admit two interfering beams light from said light source into said housing;
a pair of optical shutters corresponding to said pair of diffraction slits, said optical shutters each being selectively operable in one of a logic "0" and a logic "1" state to respectively obstruct/admit one of said beams of light from/into said housing;
whereby when both of said optical shutters are operated in a logic "1" state, said two beams of light both enter said housing and form an interference pattern comprising a series of alternating intensity maxima and minima incident along said first surface of said housing, and when both of said optical shutters are operated in a logic "0" state no light enters said housing, and when one of said optical shutters is operated in a logic "1" state while another of said optical shutters is operated in a logic "0" state one of said beams of light enters said housing and falls incident without interference on said first surface of said housing;
whereby a two dimensional image of light incident on said first surface appears at the second ends of said optical fibers and the logic states of said pair of optical shutters can be visually determined from said interference pattern.

18. An sonic logic gate, comprising:
a housing having a front surface and opposing back surface;
a source of sound waves external to the housing;
a pair of parallel diffraction slits formed in the front surface of said housing, said pair of diffraction slits including a first slit and a second slit parallely spaced to admit two interfering wavetrains of sound from said sound source into said housing;
a pair of sonic shutters corresponding to said pair of diffraction slits, said sonic shutters each being selectively operable in one of a logic "0" and a logic "1" state to respectively obstruct/admit one of said wavetrains of sound from/into said housing;
whereby when both of said sonic shutters are operated in a logic "1" state said two wavetrains of sound both enter said housing and form an interference pattern comprising a series of alternating amplitude maxima and minima incident along said back surface of said housing, when both of said sonic shutters are operated in a logic "0" state no sound enters said housing, and when one of said sonic shutters is operated in a logic "1" state while another of said sonic shutters is operated in a logic "0" state one of said wavetrains of sound enters said housing and falls incident without interference on said back surface of said housing; and
a pair of sound sensors mounted on the back surface of said housing and exposed to said pair of diffraction slits, each of said sound sensors detecting sound propagating from said diffraction slits and outputting one of a logic "0" and a logic "1" in accordance with a threshold amplitude of sound, said pair of sound sensors further including a first sensor positioned at an amplitude minima and a second sensor positioned at an amplitude maxima of said interference pattern formed when both of said sound shutters are operated in a logic "1" state.

19. The sonic logic gate according to claim 18, wherein a logical OR of the logic states of said pair of sonic shutters is indicated by said second sensor.

20. The sonic logic gate according to claim 19, wherein a logic "1" state at one of said sonic shutters is indicated by a logic "1" output from said second sensor.

21. The optical logic gate according to claim 18, wherein a logical AND of the logic states of said pair of sonic shutters is indicated by said pair of sound sensors.

22. The sonic logic gate according to claim 21, wherein a logic "1" state at both of said sonic shutters is indicated by a logic "1" output from said second sensor and a logic "0" output from said first sensor.

23. The sonic logic gate according to claim 18, wherein a logical NOT is performed on the logic state of one of said sonic shutters by selecting a logic "1" state at the other of said sonic shutters.

24. The optical logic gate according to claim 23, wherein a logical NOT is performed on the logic state of one of said sonic shutters by selecting a reference logic "1" state at the other of said sonic shutters.

25. The optical logic gate according to claim 24, wherein a logic "1" state at said one sonic shutter is indicated by a logic "0" output from a sound sensor, and a logic "0" state at said one sonic shutter is indicated by a logic "1" output from said sound sensor.

* * * * *